Figure 1:
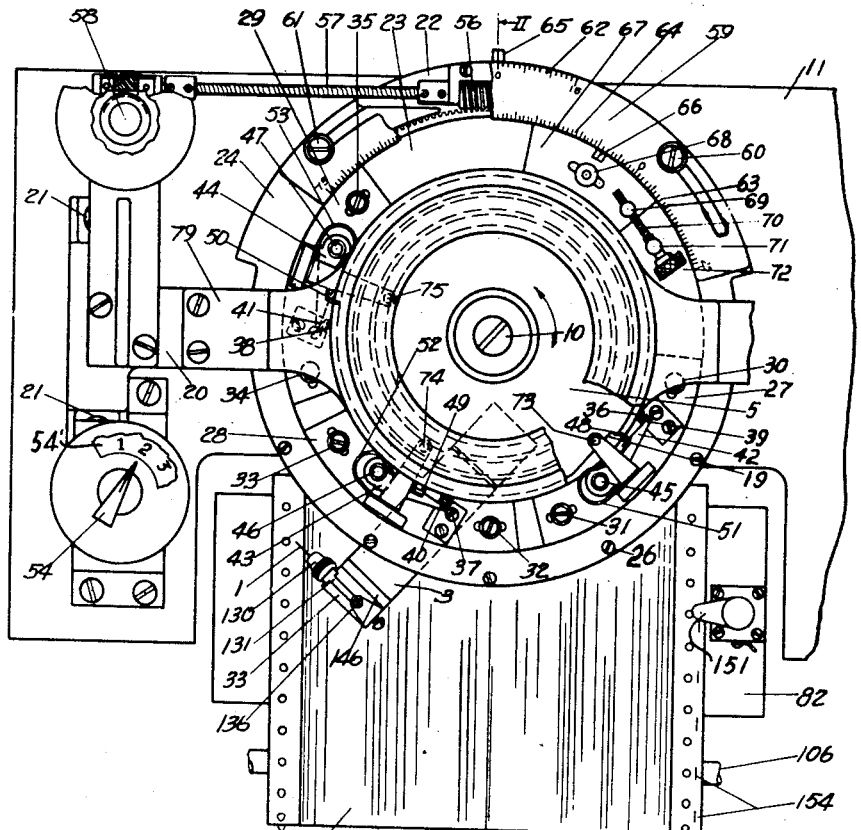

Nov. 29, 1949　　　A. E. ANDERSON　　　2,489,997
RANGE INDICATOR FOR MULTIRANGE RECORDERS
Original Filed March 6, 1940　　　3 Sheets-Sheet 1

INVENTOR.
Albert E Anderson
BY
ATTORNEY.

Nov. 29, 1949     A. E. ANDERSON     2,489,997
RANGE INDICATOR FOR MULTIRANGE RECORDERS
Original Filed March 6, 1940     3 Sheets-Sheet 2
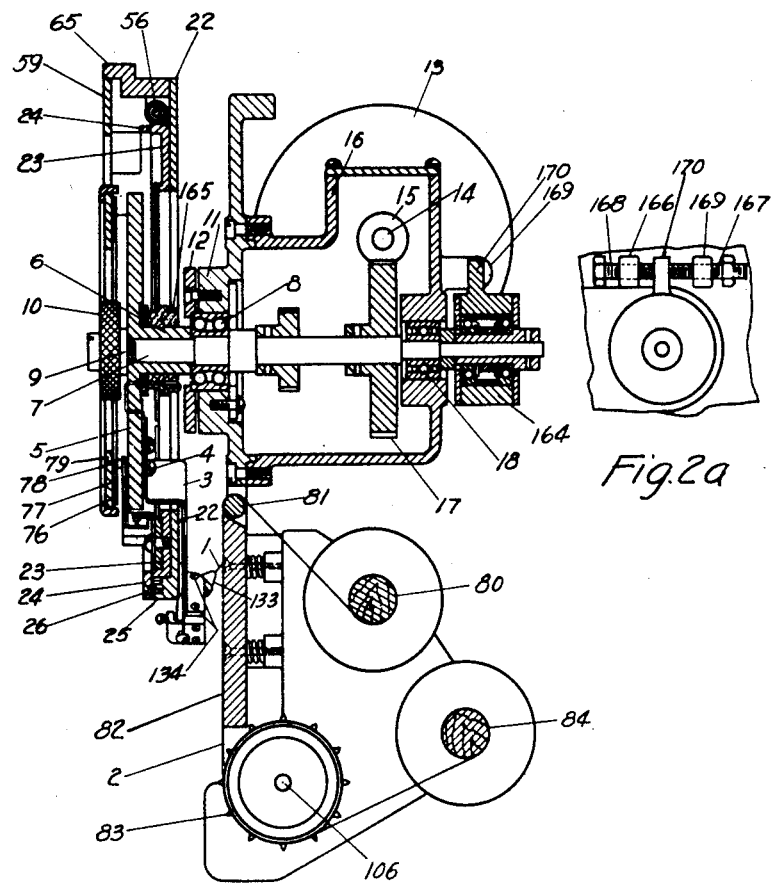
Fig. 2a
Fig. 2
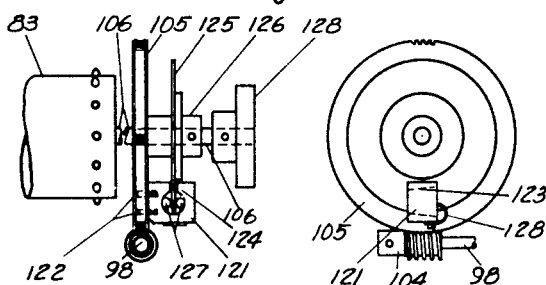
Fig. 3     Fig. 4
INVENTOR.
Albert E. Anderson
BY 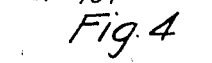
ATTORNEY.

Nov. 29, 1949     A. E. ANDERSON     2,489,997
RANGE INDICATOR FOR MULTIRANGE RECORDERS
Original Filed March 6, 1940     3 Sheets—Sheet 3
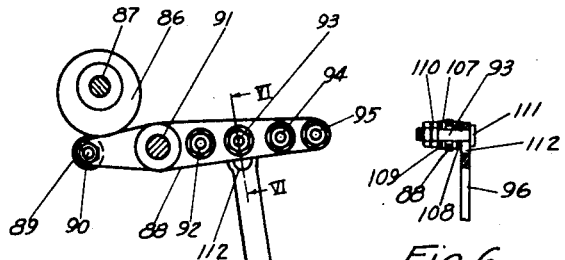
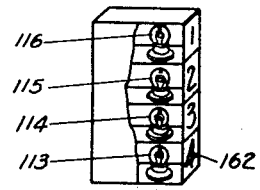
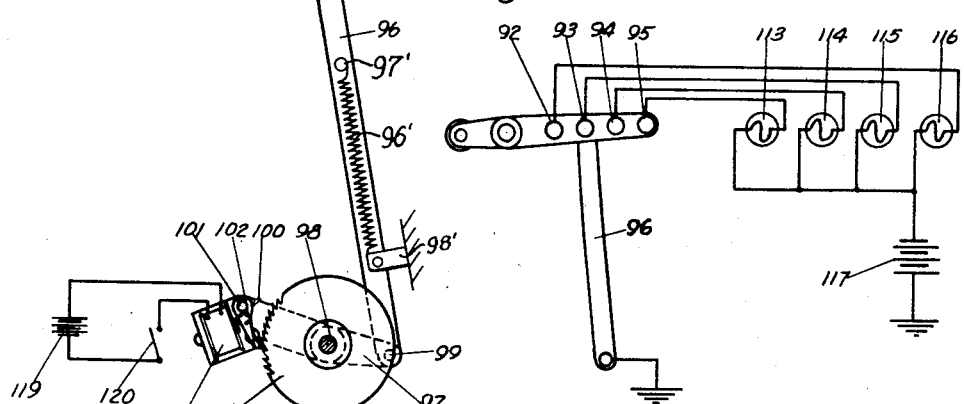
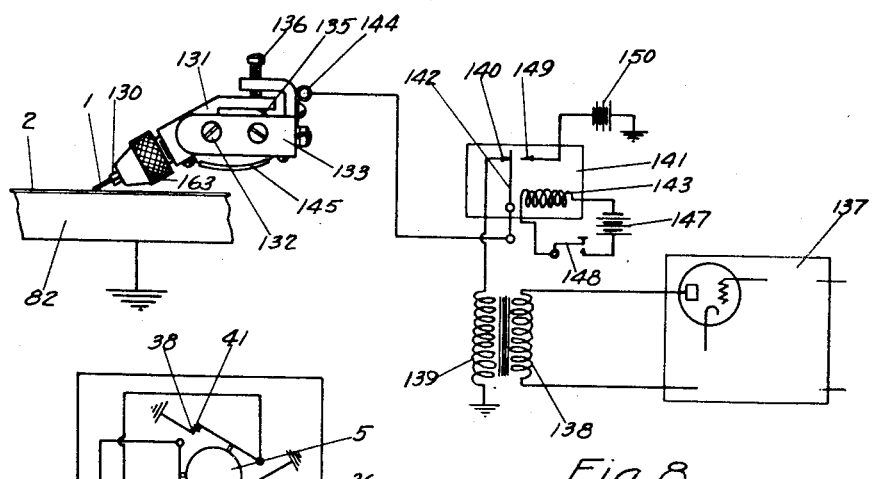
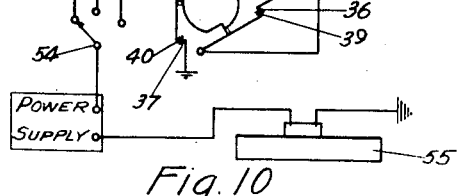
INVENTOR.
Albert E. Anderson
BY
ATTORNEY.

Patented Nov. 29, 1949

2,489,997

UNITED STATES PATENT OFFICE 2,489,997

RANGE INDICATOR FOR MULTIRANGE RECORDERS

Albert E. Anderson, Holbrook, Mass., assignor, by mesne assignments, to Raytheon Manufacturing Company, a corporation of Delaware Original application March 6, 1940, Serial No. 322,557, now Patent No. 2,350,994, dated June 13, 1944. Divided and this application September 8, 1943, Serial No. 501,727

2 Claims. (Cl. 177—311)

The present application is a division of application Serial No. 322,557, filed March 6, 1940, now Patent No. 2,350,994, dated June 13, 1944.

The present invention relates to recording apparatus particularly for recording short time intervals. Still more particularly the present invention relates to recorders for echo distance measurement in which the time interval between the transmission of a wave impulse and the receipt of a reflected impulse is used as a measure of the distance.

The present invention is particularly adapted for recording water depths obtained by the echo sound method but it may also be used for recording other short time intervals.

In echo depth sounding, a compressional wave impulse is transmitted into the water, and the impulse reflected from the ocean or river bottom, as the case may be, is received and caused to effect a marking of a record paper by a stylus which is moved at a uniform speed over the paper. Since the time interval between the transmitted and reflected signal is proportional to the distance travelled by the wave impulse, the time intervals involved are very short, particularly when shallow depths are to be measured. It is therefore necessary that the apparatus operate with a great degree of accuracy and that it maintain this accuracy under service conditions. The present invention provides a construction adapted to this end.

Where the instrument is used for survey work, particularly where very shallow depths may be encountered, the draft of the ship on which the apparatus is installed becomes significant relative to the depth being measured. This may also be true of the condition of the tide when the measurement is made. In order to obtain readings of uniform meaning it is necessary to make suitable corrections for draft and tide. The present invention provides an arrangement whereby corrections for these factors can manually be made in the recorded depth values without the necessity of making individual calculations after the record is made.

Moreover, by means of the present invention, compensation in the recorded distances can also manually be made for the squat of the vessel, which is the change in draft due to the vessel's speed. Compensation can also be made for primary elevation above sea level or some other datum which often must be taken into account when surveying rivers.

In order to be able to read the depth recorded on the chart accurately over a wide range of depth, it is necessary to expand the depth calibrations of the chart. Since the chart width itself is limited, this is best accomplished by varying the range of depths which can be recorded with a given setting of the instrument. The present invention provides an arrangement for this purpose which can be operated independently of and without disturbing the draft, squat, tide and elevation adjustments.

When surveying shallow depths, such as river bottoms, it is often desirable to be able to differentiate between individual soundings. For this purpose, the record paper is caused to travel at a relatively high speed. On the other hand, when working over large expanses of water areas, such as in the mouths of large rivers or in ocean areas, extreme detail is not required. Therefore, in order to avoid waste of record paper, the paper may be caused to travel at a much slower speed. The present invention is arranged to provide various paper speeds together with an indicating device for automatically indicating the paper speed which has been selected.

Means is also provided for completely stopping the paper feed without shutting down the recording machine as may be desirable while a survey vessel is proceeding toward a new survey station.

A further feature of the invention provides a positive means for automatically advancing the record paper while at the same time permitting free manual advance of the paper.

Another feature of the invention is the provision of an arrangement whereby a so-called "fix" mark can be made across the record paper at any desired instant, for example, when the ship crosses a predetermined position.

A still further feature of the invention provides a non-reversing mounting for the recording stylus-carrying arm whereby damage to the stylus or to the signal transmitting timing system while adjustments are being made is prevented.

Figure 9:
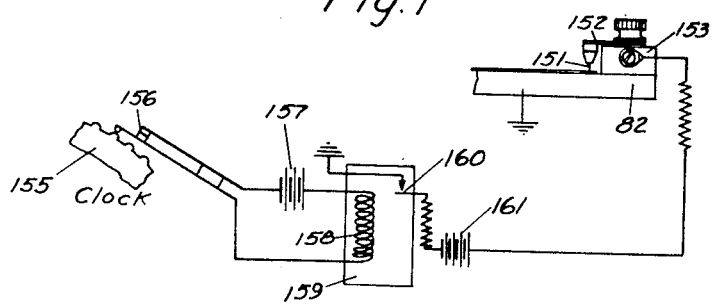

The above and other features of the present invention will best be understood from the following description taken in connection with the accompanying drawings in which Fig. 1 represents a front elevation of my recording instrument broken away in parts; Fig. 2 is a vertical section taken along the line II—II in Fig. 1; Fig. 2a is a partial back elevation of the same device; Fig. 3 is a front elevation of the arrangement for advancing the record paper; Fig. 4 is an end elevation of the same; Fig. 5 is an elevation of a portion of the automatic paper-advance mechanism; Fig. 6 is a partial section along the line VI—VI of Fig. 5; Fig. 7 is a wiring diagram of the paper-feed indicating system; Fig. 7a is a perspective view of a portion of the latter; Fig. 8 shows in elevation the recording stylus holder as well as a circuit diagram of the arrangement for producing fix marks; Fig. 9 is a schematic drawing of a time-recording arrangement; and Fig. 10 shows a schematic diagram of the signal impulse transmitting circuit.

Referring, first, to Figs. 1 and 2, a recording stylus 1 is arranged to move rapidly at a constant speed over a record paper 2. The stylus is mounted on an arm 3 fixed by screws 4 to a cam 5 which is provided with a central hub 6 by which the cam is mounted on a shaft 7. The cam is held in place on the shaft by ball bearings 8 on the one side and by the shoulder 9 of a knob 10 on the other side. The ball bearing 8 is supported in a fixed frame 11 in which it is held in position by the retaining ring 12. A constant speed motor 13 is also mounted on the frame. The motor shaft 14 carries a worm 15 within a gear box 16 where the worm meshes with gear 17 fixed to the shaft 7. The shaft 7 is further supported by ball bearings 18 mounted in the gear box casing. By this arrangement the cam 5 and therefore the stylus 1 can be rotated at a constant speed. The cam 5 is substantially circular except for a small cut-away portion 19, as shown in Fig. 1, whereby the impulse transmitting contacts are operated. A bracket 20 is fixed to the frame 11 as by screws 21. This bracket is in the form of a yoke having a central ring-shaped portion 22 which is concentric with the shaft 7. Upon the ring 22 there is mounted a ring gear 23 which is held in place by a retaining ring 24 fastened by screws 26 to an outwardly extending flange 25 formed in the ring 22. To the ring gear there are mounted a plurality of contact-carrying arcuate segments, three of which are shown as 27, 28 and 29. These are fastened to the gear 23 by the screws 30 to 35. The holes through which these screws pass are elongated whereby the angular positions of the arcuate members 27 to 29 can be adjusted. The members 27 to 29 carry fixed contacts 36 to 38, respectively, and movable contacts 39 to 41, respectively. The movable contacts are mounted on arms 42 to 44 pivoted on the members 27 to 29 at 45, 46 and 47. The arms 42 to 44 are provided with cam followers 48 to 50, respectively, which are urged against the cam by the springs 51 to 53. While the cam followers are on the high portions of the cam 5, the several sets of contacts are open, but as the cut-away portion of the cam 5 reaches each of the cam followers 48 to 50, its contacts close. It will be noted that the cut in the cam is radial at the leading edge; hence the contacts are closed very rapidly and wear of the cam does not affect the timing.

The contacts are connected in circuit with the signal impulse transmitter, for example, an underwater compressional wave transmitter 55 as shown in Fig. 10. Interposed in the circuit is a selector switch 54 whereby any one of the three sets of contacts can be selected for the operation of the transmitter 55. Therefore, although each set of contacts is closed once in each rotation of the cam 5, nevertheless only one set of contacts is effective to operate the transmitter depending upon the position of the switch 54. By this means different depth ranges can be recorded, the position of the switch 54 indicating which section of said range has been selected. The selector switch 54 has a pointer at one end which points to the position indicating sector 54' on which the different positions such as 1, 2 and 3 may be indicated.

Since the position of the ring gear 23 on which the contacts are mounted must be adjustable, as will hereafter appear, the movable contacts 39, 40 and 41 are insulated from the rest of the apparatus and are connected by brushes 73, 74 and 75 to slip rings 76, 77 and 78, respectively, which are mounted on a second yoke 79 fastened to the yoke 20. These slip rings (omitted from Fig. 10 for simplicity) are connected to the three contact studs of the selector switch 54. The stationary contacts 36, 37 and 38 may be grounded to the frame.

Now, it is important that the transmitted signal impulse be sent out at precisely the instant when the stylus 1 is at the correct angular position with respect to the depth graduations on the chart. For the first depth range, that is from zero to, say, 75 feet, the cam follower 48 must drop into the cam depression 19 and thereby close the contacts 36, 39 at precisely the instant the stylus 1 crosses the zero line. In order to make a convenient adjustment for this purpose, the ring gear 23 is engaged by a worm 56 which can be rotated through the flexible shaft 57 by rotating the knob 58. By turning this knob, the relative position of the contacts 36, 39 with respect to a predetermined position of the stylus is changed. Thereby the contacts can be made to close at the instant the stylus is in any predetermined position with respect to the record paper. It may be noted here that by the use of an irreversible motion transmitting system, such as the worm and ring gear shown, the position of the contacts can readily be changed at any time without having to operate any additional locking mechanism. Moreover, a remote control is provided by the flexible shaft so that the adjustment can be made from the outside of the instrument case. However, since all the contacts are mounted on the ring gear 23, all of them will be moved angularly together by this adjustment. For the succeeding depth ranges, therefore, the contacts 37, 40 and 38, 41 must, therefore, be independently angularly adjusted with respect to the contacts 36, 39. This is accomplished by adjusting the relative positions of the segments 27, 28 and 29 by means of the screws 30 to 35. The angular separation between the several sets of contacts can be correctly adjusted during factory assembly and it need not thereafter be disturbed. Zero adjustment for the first depth range will then be effective for all the others.

Upon the member 24 there is mounted a scale 59 by means of the screws 60, 61. The scale carries three sets of graduations 62, 63 and 64. The upper set of graduations 62 is arranged adjacent an index 65 which is fastened to the member 22 and therefore remains fixed in position. The lower sets of graduations 63 and 64 are adjacent an index 66 which is mounted on an arcuate plate 67 which is similar to the contact-carrying plates 27, 28 and 29. It is held on the ring gear 23 by a thumb screw 68 which passes through a slotted hole in the plate 67. The angular position of the plate 67 upon the geared disc 23 and therefore the position of the index 66 with respect to the contacts can be accurately adjusted by a micrometer adjustment. This comprises a post 69 fastened to the plate 67 and having a threaded hole therein adapted to receive an adjusting screw 70 which is freely journaled in another post 71 secured to the ring gear 23. By rotating the screw 70 by means of its knurled head 72, the position of the plate 67 with respect to the contacts is thereby altered. Now it will be observed that rotation of the knob 58 and consequently of the ring gear 23 changes the instant of closing of the various transmitting contacts with respect to the stylus position by an amount in depth units indicated by the index 66 on the scales 63 and 64.

Having properly set the contacts for zero position on the chart, the position of the scale-carrying member 59 is adjusted by loosening the screws 60, 61 until zero of the scale 62 is opposite the index 65. By means of the screw 70, the index 66 is set at the zero mark of scales 63 and 64. With this setting, the depth readings on the chart will be in terms of the depth beneath the compressional wave transmitter and receiver.

If the depth of water from the surface be desired, compensation must be made for the draft and squat of the vessel. In other words, to make the record on the chart read directly in terms of depth below the surface, the signal impulse must be sent out after the stylus 1 has crossed the zero mark by the time required by the stylus to move a distance on the chart equal to the ship's draft and squat. To do this, the screws 60 and 61 are loosened and the scale 62 is shifted until the proper graduation corresponding to the sum of draft and squat is opposite the index 65. The knob 58 must then be turned until the index 66 is again opposite the zero mark between the scales 63 and 64.

Should it be desired to have the recorded depth read directly in terms of mean sea level, the state of the tide must be taken into account. If the tide is above the mean value, the knob 58 is turned until the index 66 moves to the right of the zero mark to a position on scale 63 corresponding to the height of the tide above the mean value. Similarly, should the tide be below the mean value, the knob 58 is turned in the reverse direction until the index 66 is opposite the graduation on scale 64 corresponding to the amount by which the tide is below the mean value. In the former case, the transmitted signal is emitted at a time before the stylus crosses the zero line, thereby subtracting a corresponding amount from the depth actually measured; while in the latter case, the reverse is true, whereby the necessary amount is added to the measured value. Thus the recorded values are automatically referred to mean sea level.

In certain types of river surveys, it may be desirable to have a direct record not of the depth of water in the river, but of the height of the river bottom above mean sea level, or other datum. For this purpose the last calibration line on the record paper adjacent the margin at which the stylus leaves the paper is considered as a reference line, instead of the calibration line adjacent the margin at which the stylus starts across the paper, as is the usual case. By rotating the knob 58, the index 66 is then set opposite the graduation on scale 64 which corresponds to the difference between the total chart width in scale units and the known elevation of the river surface above the datum in question. It will be observed that these adjustments for elevation and tide can very easily and frequently be changed and that changing them does not vary the correction previously made for the surveying vessel's draft and squat.

The record paper 2 is preferably of the type having a carbonized or otherwise electrically conductive body with a thin coating thereon adapted to be discolored or burnt away by the passage of an electric current through the paper. The paper 2 is wound on a spool 80, whence it passes over a roller 81, thence over a marking platen 82 by power supplied by sprocket drum 83 having teeth adapted to engage perforations in the paper, and thence to a take-up spool 84.

The sprocket drum 83 is driven by a ratchet mechanism shown in Fig. 5. A cam 86, whose shaft 87 may be driven by the motor 13, by means not shown, bears against a roller 89 journaled on a stud 90, which is fastened to one arm of a lever 88 pivoted at 91. The other arm of the lever 88 is provided with a plurality of studs 92 to 95. A link 96 may be hooked on either of these studs to transmit a greater or lesser degree of motion to the bell crank 97 pivoted at 98. One arm of the bell crank 97 is pivoted to the link 96 at 99. The other arm of the bell crank carries a pawl 100 pivoted at 101 and urged by a spring 102 against ratchet wheel 103 which is fixed to the shaft 98. As shown in Figs. 3 and 4, the shaft 98 carries a worm 104 which engages gear wheel 105 which is free to revolve on the shaft 106 fixed to the drum 83. Rotation of the gear 105 is transmitted to the drum 83 by an overrunning clutch mechanism to be described later.

Referring again to Fig. 5, it will be evident that the amount of angular rotation of the sprocket wheel 103 is determined by the particular stud on the lever 88 to which the link 96 has been connected. The stud 92 gives the least motion and therefore the slowest paper feed while the stud 95 gives the greatest motion and the fastest paper feed. As previously mentioned, the choice of paper feed depends upon the detail it is desired to have visible on the record obtained. In order, however, to have an indication at all times of the rate of the paper feed, the studs 92 to 95 are insulated from the lever 88, the construction being as shown in Fig. 6. The apertures in the lever 88 for the several studs are made larger than the diameters of the studs so that insulating material 107 can be interposed. The studs are held in position in the lever 88 by a shoulder 108, a washer 109 and nut 110. The end of each stud has a second shoulder 111 forming between it and the shoulder 108 a groove into which the end of link 96 may be fitted. The end of link 96 is provided with a "keyhole" aperture 112 so that it may be slipped over the shoulder 111 on any one of the studs 92 to 95 without adjustment of any kind. For this purpose a spring 96' is provided which is fastened to a stud 97' projecting from the link 96. The other end of the spring 96' is fixed to the frame by means of the projecting bar 98' which carries a pin to which the spring is fastened. This spring exerts pressure on the link 96, holding the link 96 and the rocker bar 88 coupled to one another without any lost motion.

As shown in Fig. 7, each of the studs 92 to 95 is electrically connected to one of four indicating lamps 113 to 116, respectively, whose other terminals are connected to one terminal of a battery or other power source 117. The circuit is completed through ground to the link 96. Therefore, only one of the lamps 113 to 116 will be illuminated, depending upon the particular stud to which the link 96 is at the moment connected. The lamps 113 to 116 may be employed to illuminate separate portions of a translucent screen 162 bearing numerals indicating the rate of paper feed in inches per minute, as shown, for example, in Fig. 7a. By this means an automatic and remote indication of the rate of paper feed is obtained.

Referring again to Fig. 5, an arrangement is provided for completely stopping the paper feed but without stopping the driving motor 13 or any of the other portions of the apparatus. This comprises an electromagnet 118 mounted on the bell crank 97 in proximity to the pawl 100. The magnet 118 is connected in circuit with a battery or other power source 119 and a switch 120. When the switch 120 is closed, the electromagnet 118 is energized so that it attracts the pawl 100, preventing the latter from engaging the teeth of the ratchet wheel 103 and preventing the automatic mechanism from advancing the paper.

In order to permit free manual advance of the record paper at all times, an overrunning clutch, as shown in Figs. 3 and 4, is provided. As above described, automatic advance of the paper is obtained through the worm 98 which drives the gear 105. The latter has mounted near its periphery a block 121 held by screws 122. The block 121 has a conical hole 123 and is slotted at its upper portion at 124. A disc 125 having a hub 126 fastened to the shaft 106 of the sprocket drum 83 projects into the hole 123 through the slot 124. On the two sides of the disc 125 within the hole are two hardened steel balls 127 held in place by retaining members 128 fastened to the block 121. Rotation of the gear 105 rotates the block 121 in such a direction as to cause the balls 127 to move toward the small end of the hole 123 and thereby to engage the disc 125. This causes the latter to rotate with the gear 105 and thereby to drive the drum 83. On the other hand, manual rotation of the knob 128, which is fastened to the drum shaft 106, rotates the disc 125 so as to cause the balls 127 to move towards the large end of the hole 123, thereby permitting free rotation of the drum 83 so that the paper can be advanced freely by hand. By this construction the use of a friction clutch in the paper driving mechanism is avoided and knob 128 may easily be turned. Moreover, drum 83 is driven positively by gear 105.

The marking stylus itself together with its holder is shown enlarged in elevation in Fig. 8. The stylus 1 which may consist of a steel or other hard, electrically conducting wire is removably held in a clutch or vise 130 controlled by thumb nut 163 which is fixed to an arm 131 pivoted at 132 in a U-shaped bracket 133 which is secured to the rotating arm 3 by the screws 134 (visible in Fig. 2). The stylus end of the arm 131 is urged against the record paper 2 as it travels over the platen 82 by means of a spring 135, the tension of the spring being adjustable by means of the screw 136. The operating circuit for the stylus includes the receiver amplifier 137 which supplies the primary 138 of a voltage step-up transformer. The secondary winding 139 of this transformer has one end grounded, the other end being connected to one stationary contact 140 of a single-pole, double-throw relay 141 having a movable contact 142 and an operating coil 143. When the coil 143 is not energized, contacts 140 and 142 are closed. Contact 142 is connected to terminal 144 on the stylus holder through a brush (not shown) which bears against slip ring 165 (Fig. 2). Terminal 144 is connected to the movable stylus arm 131 by the flexible lead 145. The entire stylus holder is completely insulated from the arm 3 by a block 146 of insulating material as shown in Fig. 1. From the stylus 1 the circuit passes through the record paper 2 to the platen 82 and back through ground to the transformer secondary 139. When a reflected signal impulse is received, the amplifier 137 is energized and causes a current impulse to pass from the stylus 1 through the record paper, thereby making a mark.

It will be noted that the stylus is mounted at a relatively small angle with the paper surface, namely about 30 degrees. The stylus arm should therefore not be rotated backwards, for if this were done, it would be likely to tear the paper and bend the stylus. Moreover, backward rotation of the contact-operating cam 5 must also be avoided because of the shape of the cut 19 in the cam and of the cam followers which might thereby be broken. To prevent such backward rotation, the shaft 7 has an overrunning clutch 164 mounted on the end of the shaft. The inner element of the clutch is keyed to the shaft 7; while the outer element is fixed to the frame of the instrument. As shown in Fig. 2a, the clutch may, for example, be provided with an extending arm 170 which is held in position by screws 168, 167 threaded into ears 166, 169 formed on the back of the gear box 16. This construction is at once effective and simple, since other than the drilling and tapping of the holes for the screws 166, 167, no machine work need be done.

In order to indicate on the record the instant the survey ship passes a predetermined position on its course, it is desirable to be able readily to make a distinguishing mark or "fix" on the record paper. For this purpose the operating coil 143 of relay 141 is energized from the battery or other power source 147 by closing the key 148. This causes the movable contact 142 to move toward the relay coil and connect with contact 149 which is connected to battery or other power source 150 and thence to ground. During the transit of the stylus 1 over the record paper, the current, therefore, passes from the stylus through the paper so long as the key 148 is depressed. By this means the stylus can be made to make a mark completely across the paper when the key 148 is closed.

In survey work from a moving vessel it is frequently necessary to take note of the ship's position. This may be done by noting the ship's bearing with respect to fixed objects whose position is known. In order to be able subsequently to identify such records of the ship's position from time to time, it is desirable to have a time indication on the record chart. This is accomplished as shown in Fig. 9. A secondary stylus 151 supported from a spring 152 and an insulating block 153 mounted on the platen 82 produces short marks 154 near the margin of the record paper by means of the circuit shown in Fig. 9. A cam wheel 155 driven by a clock mechanism periodically closes contacts 156 which are connected in a series circuit containing battery or other power source 157 and operating coil 158 of a relay 159. Closing of contacts 156 closes relay contacts 160 which apply voltage from a battery or other power source 161 between stylus 151 and platen 82, whereby definite predetermined time intervals are automatically recorded on the record paper. Since the length of these marks varies with the paper speed in use at the time, the paper speed is also automatically indicated.

Having now described my invention, I claim.

1. In a depth sounding recorder, a record paper-advancing mechanism including a lever arm oscillating about a pivot, a paper-advancing drum, a ratchet and pawl mechanism for rotating said drum, a link for transmitting motion from said arm to said ratchet and pawl mechanism, means for selectively connecting said link to various positions on said arm, a plurality of electrically conductive studs insulatedly mounted on said arm one at each of said positions, said studs being adapted to engage said link, and means including an electric circuit adapted to be completed by said link and a stud for indicating the position selected.

2. In a depth sounding recorder, a record paper-advancing mechanism including a lever arm oscillating about a pivot, a paper-advancing drum, a ratchet and pawl mechanism for rotating said drum, a link for transmitting motion from said arm to said ratchet and pawl mechanism, a plurality of electrically conductive studs mounted on said arm at various distances from its pivot but insulated from said arm, said studs being adapted selectively to engage said link, a plurality of electrically operated indicators including a plurality of lamps, a power source and circuit means connecting each of said lamps to one of said studs and to said power source and said link such that the circuit of any indicator will be closed only by contact of said link with its corresponding stud.

ALBERT E. ANDERSON.

REFERENCES CITED

The following references are of record in the file of this patent:

UNITED STATES PATENTS

| Number | Name | Date |
|---|---|---|
| 504,741 | Patterson | Sept. 12, 1893 |
| 688,783 | Keiley | Dec. 10, 1901 |
| 920,487 | Murphy | May 4, 1909 |
| 1,039,724 | Gallaher | Oct. 1, 1912 |
| 1,606,014 | Wyatt | Nov. 9, 1926 |
| 1,613,520 | Marti | Jan. 4, 1927 |
| 1,732,704 | Wegner | Oct. 22, 1929 |
| 1,821,899 | Schneider | Sept. 1, 1931 |
| 1,912,263 | Del Sonno | May 30, 1933 |
| 1,935,780 | McChesney et al. | Nov. 21, 1933 |
| 2,054,996 | Upson | Sept. 22, 1936 |
| 2,060,705 | Velo | Nov. 10, 1936 |
| 2,095,851 | Aimes | Oct. 12, 1937 |
| 2,098,227 | Chauveau | Nov. 9, 1937 |
| 2,268,808 | Davis | Jan. 6, 1942 |
| 2,419,417 | Omel | Apr. 22, 1947 |